United States Patent [19]

Andreoli et al.

[11] Patent Number: 5,247,948
[45] Date of Patent: Sep. 28, 1993

[54] FILTER ASSEMBLY MACHINE

[75] Inventors: Paolo Andreoli; Giulio Barbieri, both of Bologna; Bruno Belvederi, S. Martino Di Monte S. Pietro, all of Italy

[73] Assignee: G. D Societa' Per Azioni, Italy

[21] Appl. No.: 931,514

[22] Filed: Aug. 17, 1992

Related U.S. Application Data

[63] Continuation of Ser. No. 723,805, Jul. 1, 1991, abandoned.

[30] Foreign Application Priority Data

Jul. 10, 1990 [IT] Italy .................................. 3585 A/90

[51] Int. Cl.5 .............................. A24C 5/10; A24C 5/60
[52] U.S. Cl. ........................................ 131/281; 131/65; 131/83.1; 219/121.67; 219/121.7
[58] Field of Search ................ 131/280, 281, 83.1, 131/65, 117, 94; 219/121.67, 121.7, 121.77

[56] References Cited

U.S. PATENT DOCUMENTS

| | | | |
|---|---|---|---|
| 4,083,629 | 4/1978 | Kocher et al. | 350/285 |
| 4,121,595 | 10/1978 | Heitmann et al. | 131/281 |
| 4,240,448 | 12/1980 | Heitmann et al. | 131/281 X |
| 4,281,670 | 8/1981 | Heitmann et al. | 131/281 |
| 4,302,654 | 11/1981 | Bennett et al. | 219/121.7 X |
| 4,412,120 | 10/1983 | Duruz et al. | 219/121.67 |
| 4,419,820 | 12/1983 | Stumpf | 219/121.67 X |
| 4,469,111 | 9/1984 | Pinck et al. | 131/281 |
| 4,483,351 | 11/1984 | Seragnoli | 131/282 |
| 4,531,629 | 7/1985 | Seragnoli et al. | 198/458 |
| 4,547,855 | 10/1985 | Lanyi et al. | 219/121.77 X |
| 4,645,063 | 2/1987 | Seragnoli | 198/450 |
| 4,645,900 | 2/1987 | Heyden | 219/121.67 |
| 4,745,932 | 5/1988 | Mattei et al. | 131/94 |
| 4,962,771 | 10/1990 | Neri et al. | 131/282 |

FOREIGN PATENT DOCUMENTS 1598188 9/1981 United Kingdom ................ 131/281

Primary Examiner—V. Millin
Assistant Examiner—J. Doyle
Attorney, Agent, or Firm—Marshall, O'Toole, Gerstein, Murray & Borun

[57] ABSTRACT

A filter assembly machine wherein one laser source emits a beam through a dividing device which divides the beam into two secondary beams directed respectively towards a cutting head for cutting a continuous strip into bands connecting double filters to cigarette portions, and towards a piercing device for forming ventilating holes in the bands.

6 Claims, 3 Drawing Sheets

FILTER ASSEMBLY MACHINE

This application is a continuation of U.S. application Ser. No. 07/723,805, filed Jul. 1, 1991 now abandoned.

BACKGROUND OF THE INVENTION

The present invention relates to a filter assembly machine.

In particular, the present invention relates to a filter assembly machine for producing so-called "ventilated" cigarettes, i.e. cigarettes with ventilating holes formed in the band covering and connecting the filter to the cigarette portion.

On filter assembly machines of the aforementioned type, the ventilating holes are formed using a laser beam piercing device normally comprising an overpowered, relatively high-cost laser source, which usually makes the device unfeasible for other than special applications.

SUMMARY OF THE INVENTION

It is an object of the present invention to provide a filter assembly machine of the aforementioned type, enabling economical use to be made of the laser source by employing it, not only for forming ventilating holes, but also for at least one additional function. According to the present invention, there is provided a filter assembly machine comprising a laser piercing device for forming ventilating holes in the bands connecting the filters to the cigarette portions; a laser source emitting a main laser beam for said piercing device; and a cutting device for producing said bands from a continuous strip; characterised by the fact that it comprises dividing means for dividing said main beam into at least two secondary beams directed respectively towards said piercing device and said cutting device.

DESCRIPTION OF THE DRAWINGS

A non-limiting embodiment of the present invention will be described by way of example with reference to the accompanying drawings, in which.

DETAILED DESCRIPTION OF THE INVENTION

Figure 1:
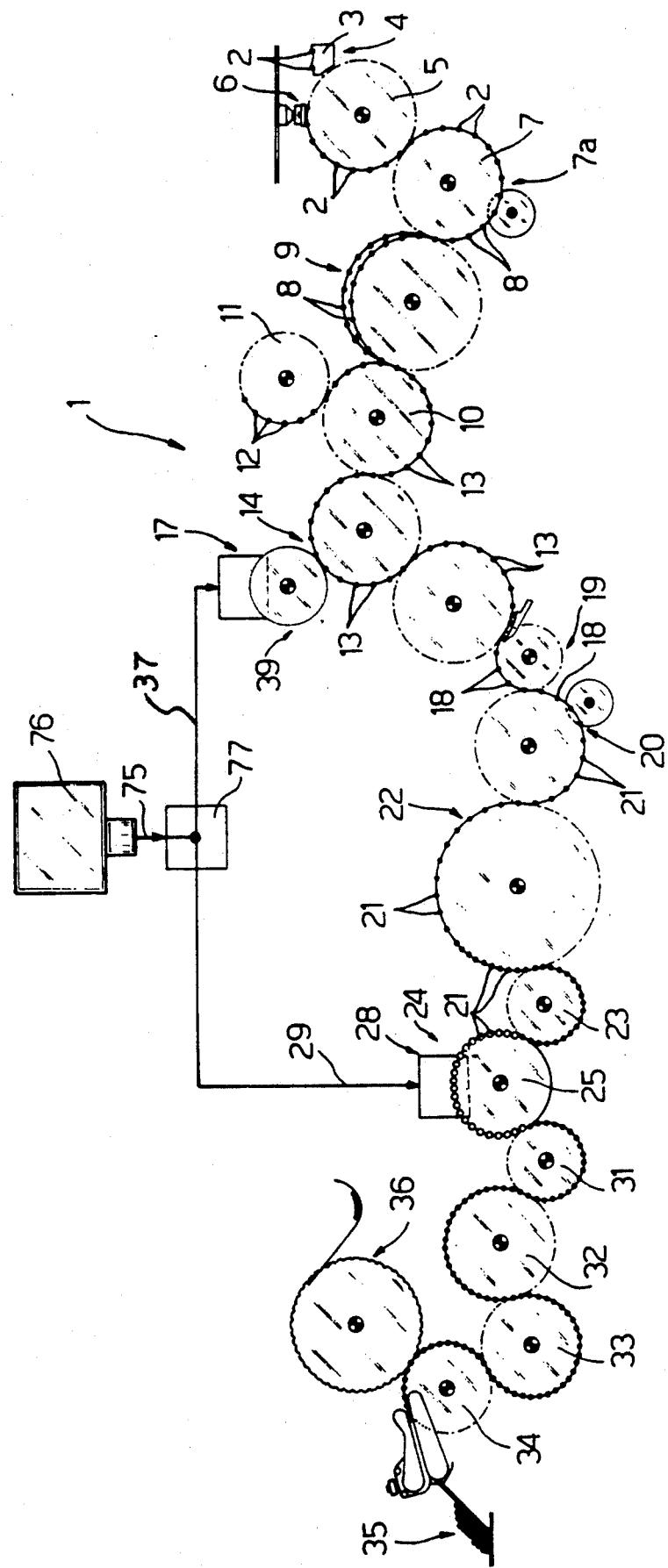
FIG. 1 shows a schematic, partial block diagram of a preferred embodiment of a filter assembly machine in accordance with the present invention.

Number 1 in FIG. 1 indicates a filter assembly machine for successively receiving double cigarette portions 2 off the output beam 3 of a manufacturing machine 4, which, in the example shown, is a dual-rod cigarette manufacturing machine.

Double portions 2 are transferred from beam 3 to he input roller 5 of machine 1 by a known transfer device 6 of the type described in U.S. Pat. No. 4,645,063, and are fed by a follow-up roller 7 through a cutting station 7a where each double portion 2 is cut into two aligned single portions 8. Each pair of single portions 8 is then fed by roller 7 to an axial parting device 9 of the type described in U.S. Pat. No. 4,531,629. Axially-parted portions 8 are fed by device 9 to a transfer roller 10 supplied by a tangent feed roller 11 with double filters 12, each of which is fed into the gap between two aligned portions 8 to form a unit 13. Units 13 are fed successively by roller 10 to a device 14 supplying bands 15 (FIGS. 2 and 3) cut from a continuous strip 16 by a cutting device 17 and wrapped about double filters 12 to connect them to the ends of respective adjacent portions 8 and so form double cigarettes 18. Double cigarettes 18 are formed inside a rolling device 19 of the type described in U.S. Pat. No. 4,745,932, in which double cigarettes 18 are fed through a cutting station 20 where they are cut transversely in half into two cigarettes 21 arranged with their filters facing and contacting each other.

Figure 2:
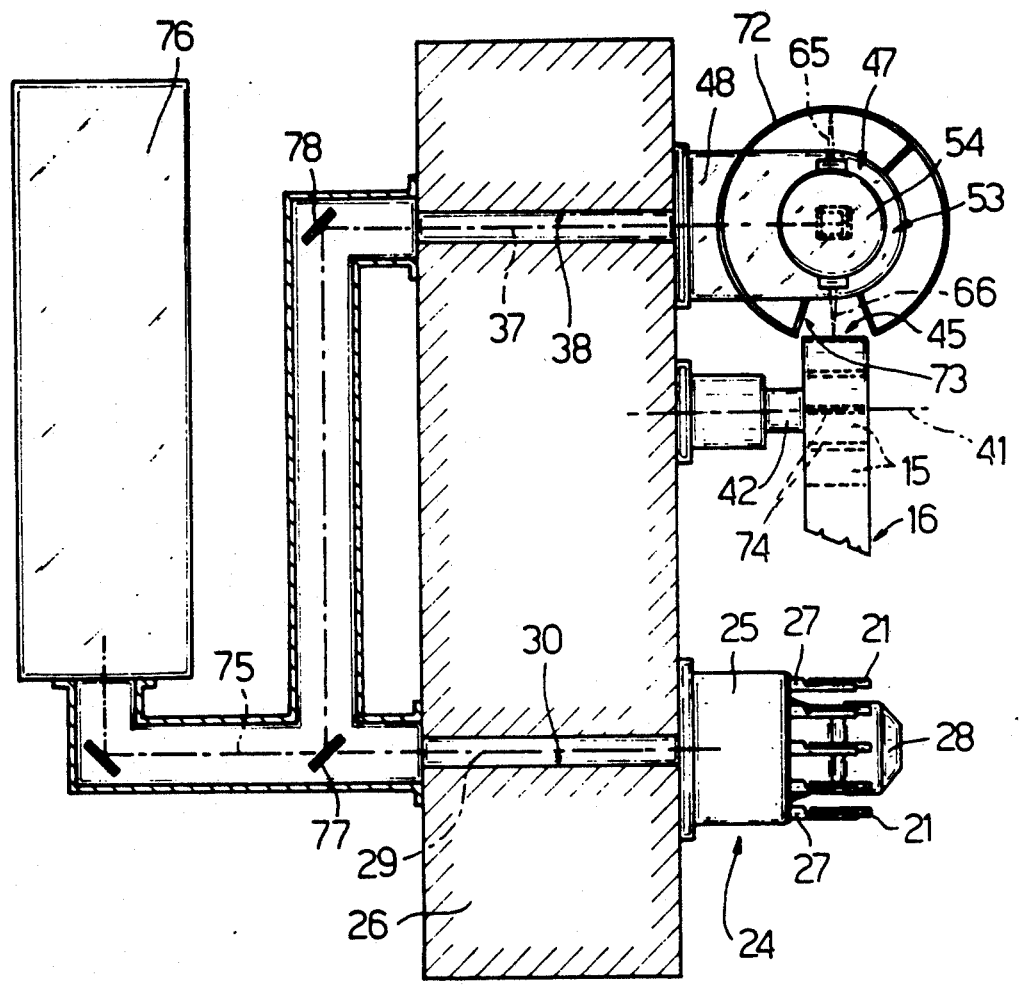
FIG. 2 shows a schematic side view of a detail in FIG. 1.
Figure 3:
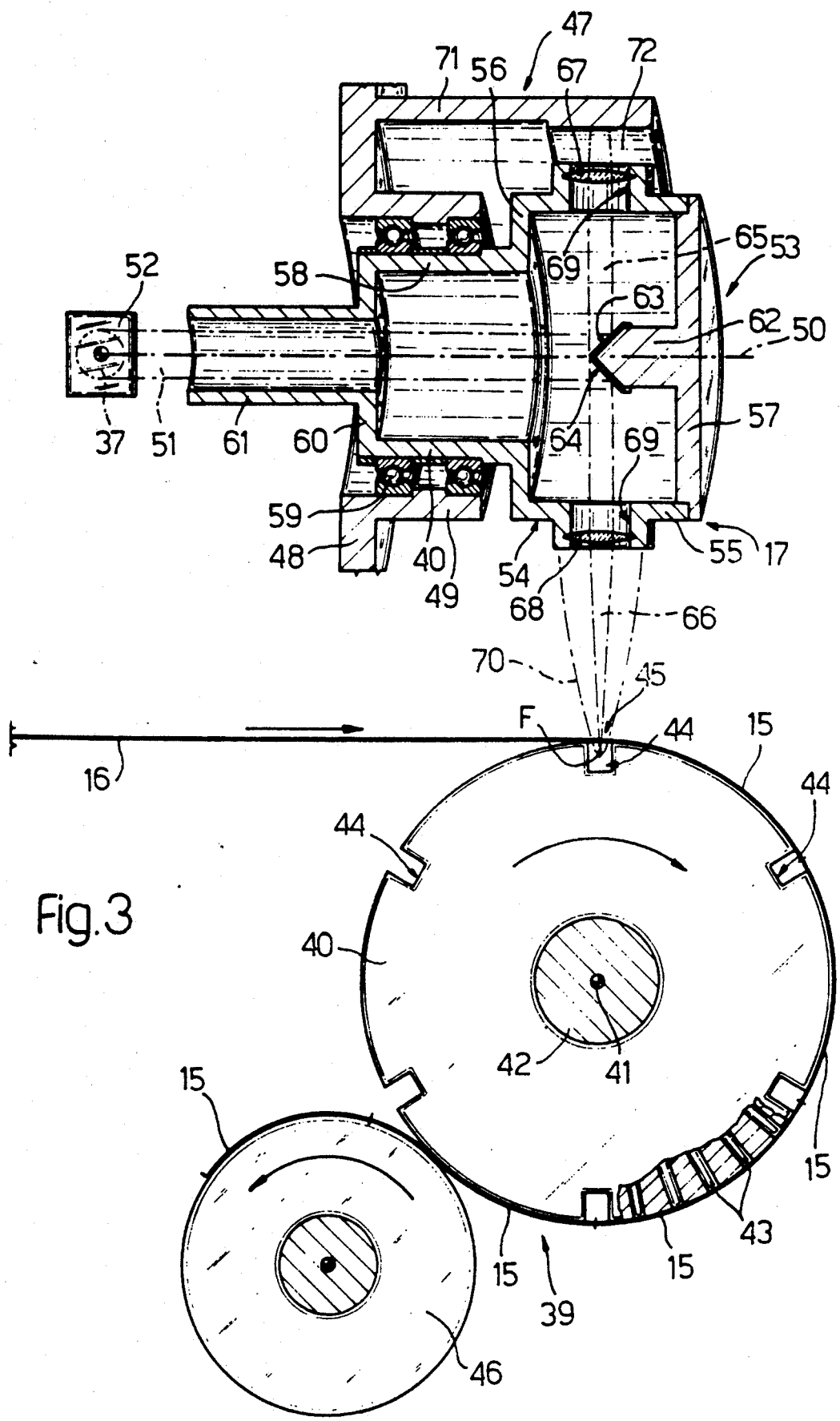
FIG. 3 shows a schematic, larger-scale section of a detail in FIG. 2.

Rolling device 19 feeds each pair of opposed cigarettes 21 to a turnover device 22 of the type described in U.S. Pat. No. 4,483,351, which arranges cigarettes 21 side by side with the filters all facing the same way. On leaving turnover device 22, cigarettes 21 are fed successively by a transfer roller 23 to a piercing device 24 of the type described in Italian Patent Application N. 3516A/89, filed on Jun. 13, 1989 the U.S. counterpart of which is U.S. patent application Ser. No. 07/534,486 filed Jun. 7, 1990, and to which full reference is made herein in the interest of full disclosure. As shown in FIG. 2 and in accordance with the above patent, piercing device 24 comprises a drum 25 mounted for rotation on a support 26 and having a number of axial housings 27 rotating about their axes and each defining a seat for a respective cigarette 21, the filter of which projects outwards of housing 27, facing a laser beam piercing head 28 turning about is axis and coaxial with drum 25. Laser head 28 receives a laser beam 29 along a duct 30 formed through support 26 and coaxial with drum 25, and provides for forming a ring of ventilating holes (not shown) in the filter band of each cigarette 21 in respective housing 27. On leaving piercing device 24, cigarettes 21 are fed by a series of transfer rollers 31, 32 and 33 to an output roller 34 by which they are fed successively to a conveyor channel 35, and which is located tangent to a pickup unit 36 of the type described in Italian Patent Application N. 3386A/88 filed on Mar. 21, 1988. U.S. patent application Ser. No. 07/323,973 filed Mar. 16, 1989 is a counterpart of this Italian application and U.S. Pat. No. 4,962,771 was granted on the U.S. Application. As shown in FIG. 2 and particularly in FIG. 3, cutting device 17 receives a laser beam 37 along a duct 38 formed through support 26 and parallel to duct 30. On cutting device 17, strip 16 is fed continuously by a feed device 39 comprising a roller 40 turned by drive means (not shown) about the axis 41 of a shaft 42 connected to support 26. For feeding strip 16, the outer periphery of roller 40 presents a number of radial openings 43 Communicating in known manner (not shown) with a known suction system (not shown). Roller 40 also presents a number of peripheral grooves 44 parallel to axis 41 and equally spaced about roller 40 at intervals equal to the required length of bands 15. Roller 40 feeds strip 16 through a cutting station 45 where it is cut into bands 15, which are fed successively by roller 40 to a tangent output roller 46 also having known suction means (not shown).

Roller 46, which for simplicity is not shown in FIG. 1, feeds bands 15 successively to rolling device 19. Cutting device 17 comprises a cutting unit 47 in turn comprising a wall 48 projecting from support 26, parallel to duct 38, and fitted through with a cylindrical coupling 49, the axis 50 of which coincides with the axis of a laser beam 51 produced by deflecting beam 37 ninety degrees by means of a reflecting element 52.

Coupling 49 is fitted through with a rotary cutting head 53 rotated by actuating means (not shown) at a given speed about axis 50, and comprising a hollow cylindrical drum 54 located outside and on the opposite side of reflecting element 52 in relation to coupling 49. Drum 54 is coaxial with axis 50, and presents a cylindrical lateral wall 55 closed, on the side facing coupling 49, by a first flat annular wall 56, and, on the opposite side, by a second continuous flat wall 57 parallel to wall 56 and perpendicular to axis 50. From the inner periphery of annular wall 56, there extends outwards a tubular appendix 58 coaxial with axis 50 and connected to the inner surface of coupling 49 via the interposition of bearing 59. On the end facing reflecting element 52, appendix 58 is closed by an annular wall 60, from the inner periphery of which there extends, towards refecting element 52, a further tubular appendix 61, the open free end of which faces reflecting element 52 and forms the inlet of beam 51 into cutting head 53.

Wall 57 presents an inner projection 62 coaxial with axis 50 and defined, on the side facing reflecting element 52, by two flat reflecting surfaces 63 and 64 joined to produce a rectangular dihedral, the edge of which, facing reflecting element 52, intersects axis 50. Both surfaces 63 and 64 form a substantially 45° angle with axis 50, so as to intercept respective halves of beam 51 and define respective reflected beams 65 and 66 directed radially outwards on to respective focusing lenses 67 and 68 mounted in respective radial holes 69 through wall 55.

Lenses 67 and 68 focus respective reflected beams 65 and 66 at respective focal points F, which, due to the rotation of cutting head 53 about axis 50, travel along a trajectory 70 interfering with the route of strip 16 at cutting station 45.

Trajectory 70 lies in a plane perpendicular to axis 50 and forming an angle (not shown) with a generating line of roller 40 across axis 50, i.e. with the axis of any one of grooves 44, the sine of which angle is substantially equal to the ratio between the traveling speed of strip 16 and the speed at which each focal point F travels along trajectory 70. Also, the speed ratio of roller 40 and cutting head 53 is such that a focal point F traveling along trajectory 70 reaches station 45 simultaneously with the end of a groove 44 located upstream in relation to the traveling direction of focal point F along trajectory 70.

About coupling 49, wall 48 is fitted with substantially horizontal brackets 71 supporting a curved plate 72 coaxial with and outside wall 55.

As shown in FIG. 2, plate 72 acts as a dimming device enclosing substantially the whole of cutting head 53 and having a side window 73 facing station 45 and wide enough to allow each reflected or reflected beam 65, 66 to reach and make a respective cut 74 through strip 16. As shown in FIGS. 1 and 2, laser beams 29 and 37 are produced by a dividing device dividing a main laser beam 75 emitted by a single laser source 76. In the example shown, said dividing device consists of a semitransparent mirror 77, which lets through part of beam 75 to define beam 29 directed towards piercing device 24 along duct 30, and reflects the rest of main beam 75 to define beam 37 directed on to reflecting element 52 along duct 38 and via deflecting device 78. More than one semitransparent mirror 77 may of course be used for dividing main beam 75 into more than two secondary beams for additional user devices on machine 1.

We claim:

1. A filter assembly machine (1) comprising:
    a laser piercing device (24) for forming ventilating holes in bands (15) connecting filters (12) to cigarette portions (8);
    a laser cutting device (17) for producing said bands (15) from a continuous strip (16);
    a laser source (76) emitting a main laser beam (75);
    dividing means (77) for dividing the main beam (75) into at least two secondary laser beams (29, 37);
    means for directing one (29) of the secondary laser beams (29, 37) to the piercing device (24);
    means for directing the other (37) of the secondary laser beams (29, 37) to the cutting device (17);
    the cutting device (17) comprising feeding and guide means (39) for continuously feeding said strip (16) along a predetermined route;
    a cutting station (45) along said route;
    the cutting station having a cutting unit (47) for successively making a series of transverse cuts (74) through said strip (16);
    the cutting unit (47) comprising a cutting head (53) and first supporting means (48) to which said cutting head (53) is connected so that the head can rotate about an axis (50);
    the cutting head (53) comprising reflecting means (63, 64) for receiving, via deflecting means (78, 52), the said other (37) of the secondary laser beams (37, 51) substantially parallel to said axis (50), and for forming at least one reflected transverse laser beam (65, 66);
    lens means (67, 68) for focusing said reflected laser beam (65, 66) at a focal point (F); and
    second supporting means (54) for said reflecting means (63, 64) and said lens means (67, 68), the second supporting means (54) rotating about said axis (50) for moving said focal point (F) along an annular trajectory (70), the plane of which intersects the route of said strip (16) at said cutting station (45) and forms a given angle with a line intersecting the route of said strip (16).

2. A machine according to claim 1 in which the said feeding and guide means (39) comprise a suction roller (40) for feeding said strip (16) through said cutting station (45); said suction roller (40) presenting peripheral grooves (44) over which said strip (16) extends longitudinally at said cutting station (45).

3. A machine according to claim 1 in which the reflecting means comprises two reflecting surfaces (63, 64) perpendicular to each other and with each said surface (63, 64) forming a substantially 45° angle with said axis (50); each said reflecting surface (63, 64) defining a respective said-reflected laser beam (65, 66) extending through said respective lens means (67, 68) so as to be focused at a respective said focal point (F).

4. A machine according to claim 1 in which the second supporting means comprises a hollow drum (54) coaxial with said axis (50) and having a substantially cylindrical lateral wall (55) supporting said lens means (67, 68), and an end wall (57) fitted with said reflecting means (63, 64).

5. A filter assembly machine (1) comprising:
    a laser piercing device (24) for forming ventilating holes in bands (15) connecting filters (12) cigarette portions (8);
    a laser cutting device (17) for producing said bands (15) from a continuous strip (16);
    a laser source (76) emitting a main laser beam (75);

dividing means (77) for dividing the main beam (75) into at least two secondary laser beams (29, 37);

means for directing one (29) of the secondary laser beams (29, 37) to the piercing device (24);

means for directing the other (37) of the secondary laser beams (29, 37) to the laser cutting device (17); and the laser cutting device (17) comprising a rotary cutting head (53) for emitting at least one substantially radial laser beam (65, 66) movable with the cutting head (53) to sweep through an advancement path of the strip (16) to cut the strip and produce bands (15).

6. A machine according to claim 1 including dimming means (72) for intercepting said reflected beam (65, 66) when said respective focal point (F) is outside said cutting station (45).

* * * * *